No. 618,966. Patented Feb. 7, 1899.
J. W. TYGARD.
VARIABLE DIAMETER WHEEL.
(Application filed Oct. 13, 1896.)

(No Model.) 2 Sheets—Sheet I.

Witnesses.
Fred. C. Tygard.
E. A. Tygard

Inventor.
James Wallace Tygard.

No. 618,966. Patented Feb. 7, 1899.
J. W. TYGARD.
VARIABLE DIAMETER WHEEL.
(Application filed Oct. 13, 1896.)
(No Model.) 2 Sheets—Sheet 2.
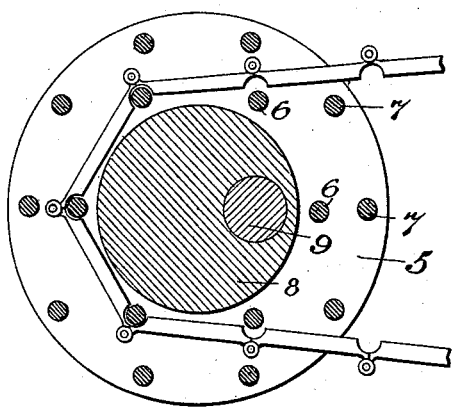
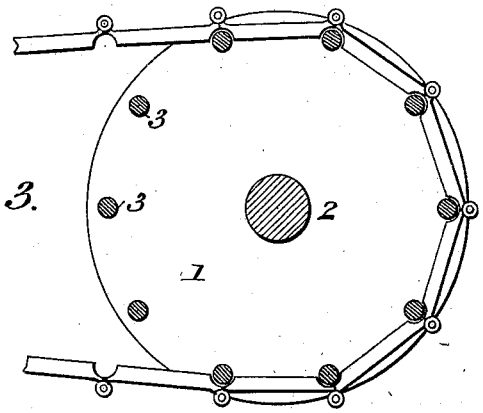
Fig. 3.
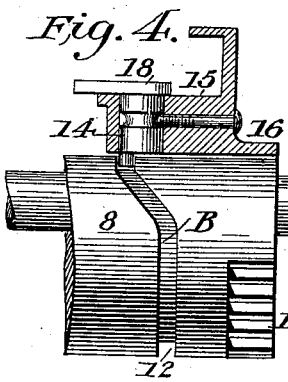
Fig. 4.
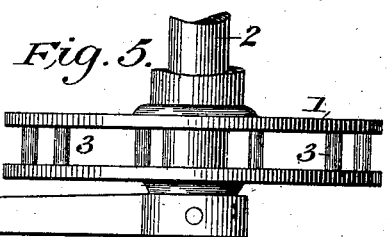
Fig. 5.
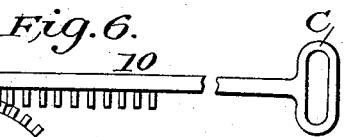
Fig. 6.
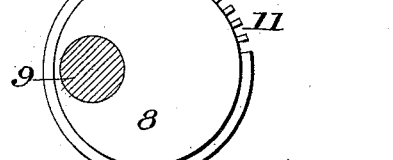
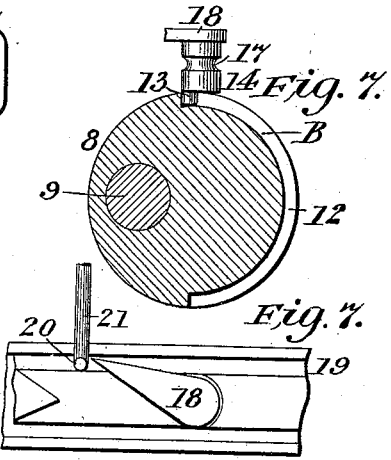
Fig. 8. Fig. 7.
Witnesses.
Fred. C. Tygard.
E. A. Tygard
Inventor.
James Wallace Tygard

UNITED STATES PATENT OFFICE.

JAMES WALLACE TYGARD, OF PITTSBURG, PENNSYLVANIA, ASSIGNOR TO IRA J. WILSON AND THE TYGARD COMPANY, OF SAME PLACE.

VARIABLE-DIAMETER WHEEL.

SPECIFICATION forming part of Letters Patent No. 618,966, dated February 7, 1899.

Application filed October 13, 1896. Serial No. 608,782. (No model.)

*To all whom it may concern:*

Be it known that I, JAMES WALLACE TYGARD, a citizen of the United States, residing at Pittsburg, in the county of Allegheny and State of Pennsylvania, have invented a new and useful Variable-Diameter Wheel or Pulley, of which the following is a specification.

The nature of my invention consists in such construction and organized combination of mechanical parts constituting a wheel or pulley as that without stopping or reduction of rotary speed it can be instantly changed within itself from a quick to a slow rate of speed, and vice versa. The means whereby I accomplish such results will be readily understood from the following description, taken in connection with the accompanying drawings, wherein—

Figure 1:
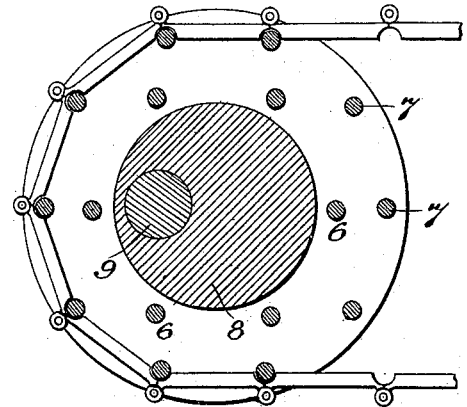
Figure 1:
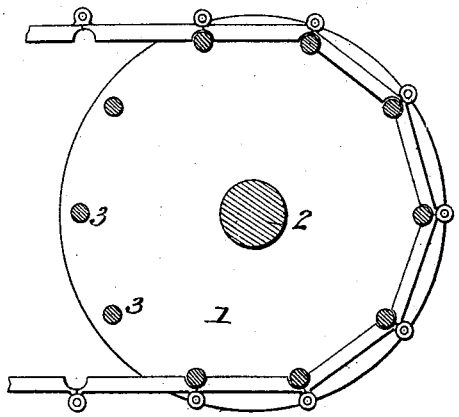
Figure 2:
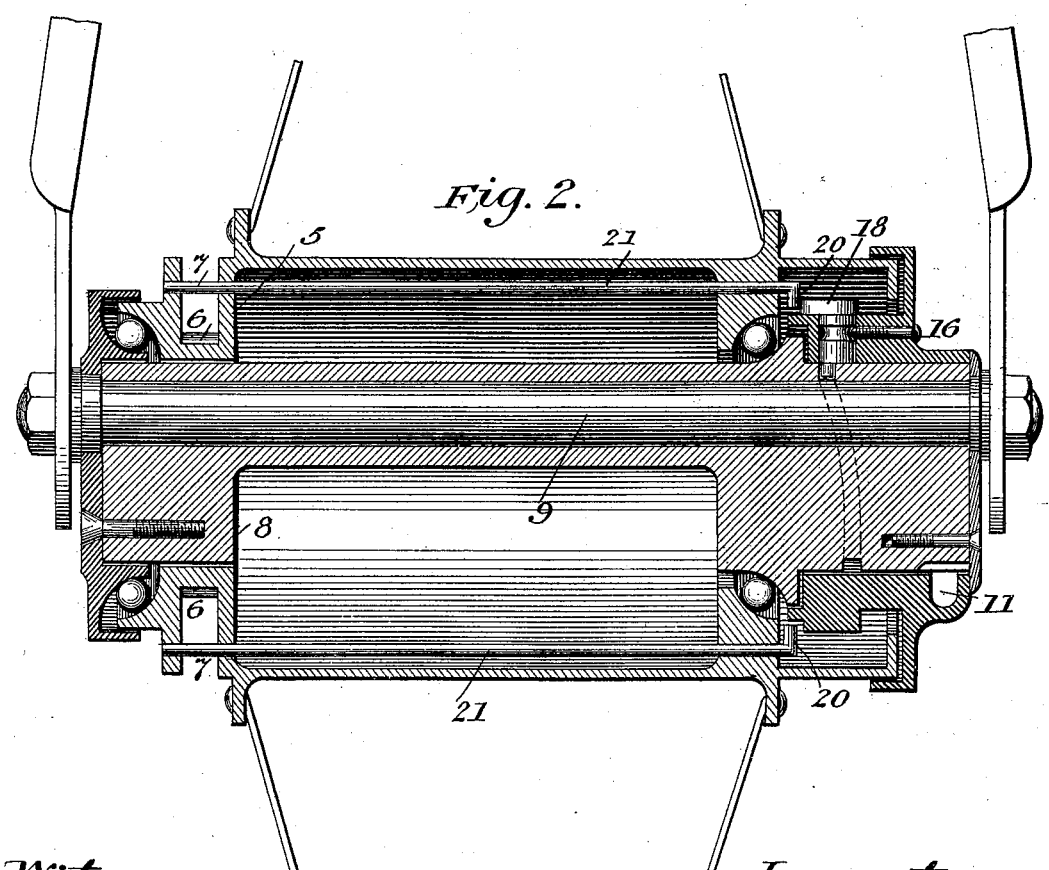

Figure 1 represents a wheel rotated by primary applied force transmitting the same degree of rotary motion by means of a belt to another wheel which is constructed and adapted to change its diameter when and as required; Fig. 2, a diametrical section in the direction of its axis of my speed-varying contrivance applied to the hind wheel of a bicycle and its supporting-frame; Fig. 3, the belt-driven wheel changed from a slow to a quicker rate of speed; Figs. 4, 5, 6, 7, 8, and 9, detail drawings to make plain such parts as otherwise might not be understood.

The object of my invention is to provide a belt-driven wheel containing within itself such mechanism as will without stopping enable its driving-belt to be shifted nearer to or farther from the axis of said wheel, whereby a greater or less degree of speed may be attained therein convertible the one into the other without varying the speed of its belt or affecting its actuating relation to the primary driving-wheel.

In the drawings, 1 is a wheel which is securely fixed on a central shaft 2, deriving revolving motion from any directly-applied force, which wheel may be provided with radially-projecting teeth or series of transverse pins 3, arranged around and fastened near its rim, so as to actuate a properly-adjusted belt or chain 4 thereon. The belt or chain 4 may be of any suitable construction and extended around a distant wheel 5, so as to impart a positive rotary motion to it.

The secondary or belt-driven wheel 5 is provided with a series of permanently-fixed pins or belt-engaging points 6, arranged in a circle a suitable distance from and around its axis, and in addition thereto with a number of separately-movable pins 7 or belt-engaging surfaces arranged in a concentric circle nearer the rim of said wheel and adapted to revolve around a central cylindrical core 8, supported by a stationary shaft 9, eccentric to said core and wheel, whereby on turning said core one-half a revolution around its eccentric supporting-shaft in one direction its circumferential wheel will be caused to change its position and approach the primary driven wheel a distance equal to such eccentric movement. A reversal of said core will reinstate the chain-driven wheel by carrying it back to its former position.

The rotation of the central core 8 is effected by means of a longitudinally-moving toothed rack 10 in engagement with a corresponding number of teeth 11, formed in and partially around one end of said core. The rack 10 may be moved by the handle C (shown in Fig. 6) or by other suitable means. A groove 12 is also formed in and around a portion of the central core, which groove 12 for a short distance from one end thereof extends obliquely to a point B and from thence circumferentially nearly half-way around the core 8, as shown in the drawings, Figs. 4 and 7, and in said groove is located a short pin 13, which is eccentrically and permanently attached to the adjacent end of a stout pivot 14, supported within a suitable bearing 15 and adapted to turn back and forth on its axis as its pin is operated on by said oblique groove, which produces and controls its movement. A small screw 16, the point of which enters a circumferential channel 17 in the pivot 14, holds the same in place.

On top of the pivot 14 and integral therewith is a wedge-shaped switch 18, its sharp end extending outward a suitable distance and adapted to have a limited lateral movement to either side of a circular raceway 19, in which are located the inwardly bent or hooked ends 20 of a series of equidistant circumferentially-arranged rods 21, that extend into said raceway, and by continuation through the walls of the belt-driven wheel 5 constitute the outer row of movable pins 7, upon which the belt 4 operates and which are easily pushed in to engage said belt or drawn out of its way separately and in regular progressive order as the bent ends 20 of the rods 21 severally come in revolving contact with the switch, whereby the belt may engage the inner row of pins 6 or those nearer the center of the wheel. Therefore the position of the outer row of pins is dependent upon the position of the switch, which if moved to one side will press said rods or pins outwardly across and into the pathway of the belt and if moved to the opposite side will in like manner draw said rods or pins out of and clear of said pathway. The switch 18 is stationary and located in such relative position to the revolving parts as that only those rods or pins not in immediate contact with the chain or belt are shifted, being easily moved by the switch.

Assuming that the chain or belt 4 is moving at a given rate of speed and is on the outer row of pins 7 in the belt-driven wheel 5, then its rotation will correspond to the travel of the belt around a wheel whose diameter is equal to the radial position of said pins. By simply reversing the position of the central core 8 the oblique portion of the groove 12 causes the pin 13 and pivot 14 to move around and change the switch 18 to the opposite side of the circular raceway 19, whereby the outer row of pins 7 as they momentarily become disengaged are withdrawn, enabling the belt to move inwardly and engage those pins 6 nearer the center of the wheel, by which operation its speed is greatly increased without stopping its rotation or reducing the speed of said belt. As the central core 8 is moved around to the opposite side of its eccentrically-arranged and stationary shaft 9 it carries the belt-driven wheel with it, and thereby increases the distance between its axis and that of the primary power-driven wheel 1, taking up such slack of the belt as would otherwise occur and increasing the speed of the wheel under constant strain of the belt. By reversing the position of the central core 8 the pin 13 will move along the straight portion of the groove 12 and cause the belt-driven wheel to approach the power-driven wheel, and thus loosen the belt preparatory to any shifting of the pins. The switch 18 is reversed and brought to such position as that it will press the movable rods or pins outwardly and across the pathway of the belt as they separately come in contact with said switch and slide along one of its inclined edges until their hooked ends 20 are properly within the circular raceway 19 on that side of said switch, where they will remain until said switch is reversed and they are again pressed over into the opposite and parallel raceway, as shown in the alternate flat drawings, Figs. 8 and 9. The belt will engage the several pins as they are successively presented and arrive in proper position; but just before each pin comes in contact with the running belt the axis of the chain-driven wheel 5 is moved to compensate for any difference occurring in the belt when said wheel is changing speed.

Although my invention is shown as applied to a bicycle, I wish it distinctly understood that it is not thereby limited to that, as the same contrivance, with slight modifications, may be successfully applied to other and various machines.

Having thus described my invention, I claim—

1. An organized mechanism consisting of a wheel driven by primary applied force; an endless chain actuated thereby; a wheel driven by said chain, a central cylindrical core around which said wheel revolves, a stationary supporting-shaft eccentric to said core and wheel, a number of permanently-fixed pins or teeth arranged parallel to each other and the axis of the wheel, and in addition thereto a number of separately-movable pins or belt-engaging surfaces arranged at equidistant concentric points nearer the rim of said belt-driven wheel, and means for shifting the movable pins.

2. A wheel provided with fixed projecting teeth and a number of movable teeth nearer its rim, an endless chain adapted to operate thereon and be shifted from the fixed teeth onto the movable teeth and vice versa; means for operating the movable pins or teeth, an eccentric core around which said wheel revolves, adjustable with respect to any requirements of the chain by the operation of shifting the position of the movable pins; a suitable wheel driven by primary applied force to operate the chain belt and drive the variable-diameter wheel.

3. A primary power-driven wheel provided with a suitable number of projecting pins or belt-engaging surfaces; an endless chain adapted to operate thereon; a wheel which has a number of fixed inner teeth and a number of movable teeth or pins located nearer its rim; a means for shifting the chain from the fixed pins onto the movable pins and vice versa, and suitable means for changing and regulating the distance between the primary power-driven wheel and the chain-driven wheel as the position of the pins change with relation to the chain.

JAMES WALLACE TYGARD.

Witnesses:
E. A. TYGARD,
IRA J. WILSON.